G. MARSHALL.
MACHINE FOR MAKING SHOCKS.
APPLICATION FILED MAY 3, 1909.
937,454.
Patented Oct. 19, 1909
4 SHEETS—SHEET 1.
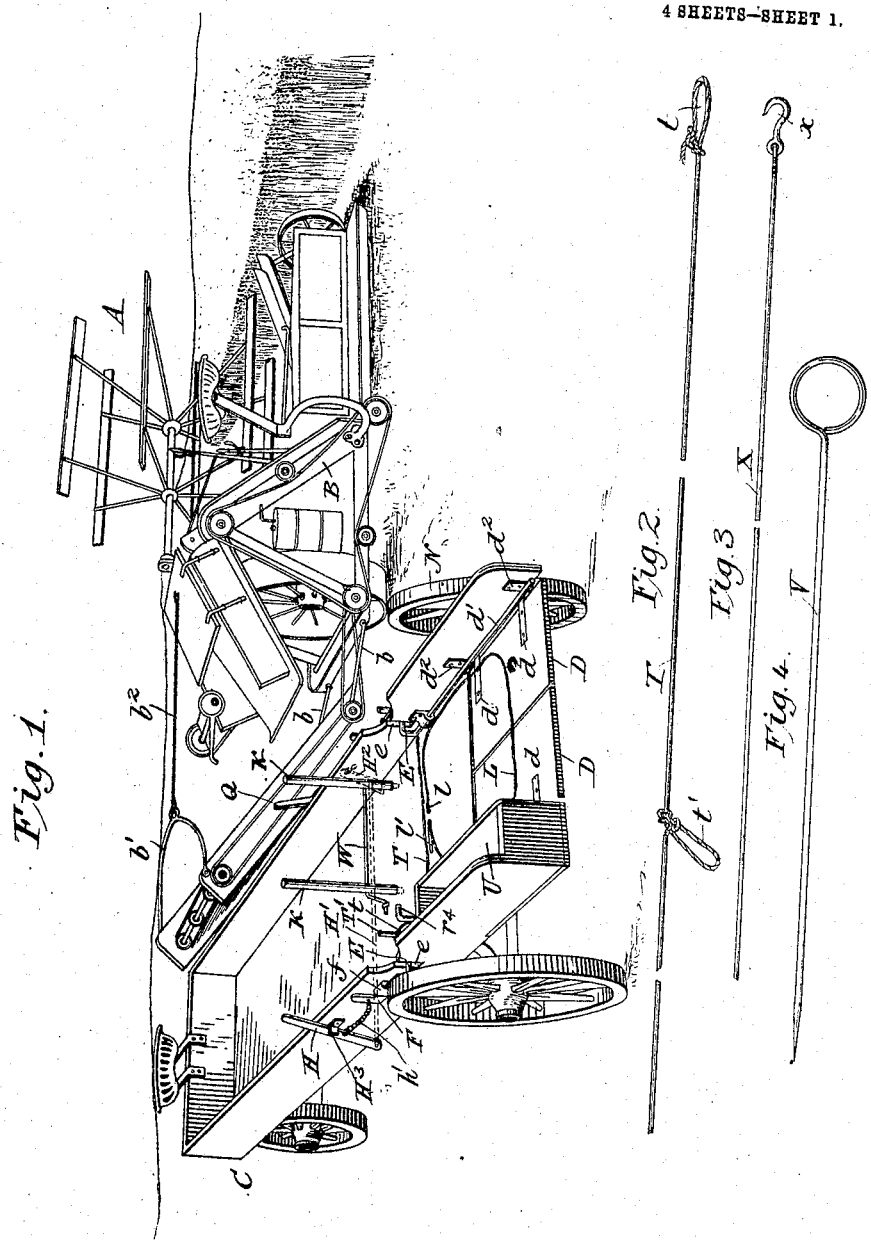
Witnesses;
E. B. Franzoni
M. E. Burrell
Inventor;
GEORGE MARSHALL
by his attorneys
Baldwin Wight

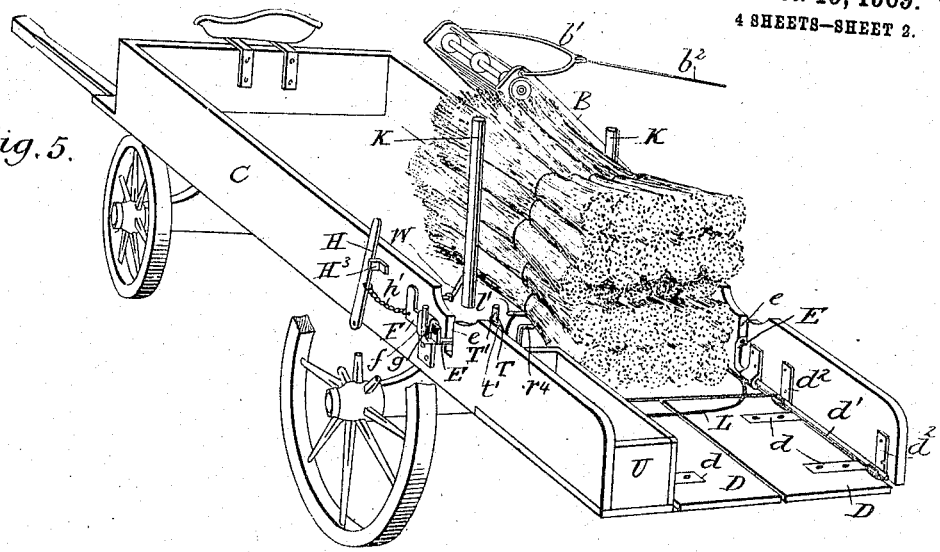
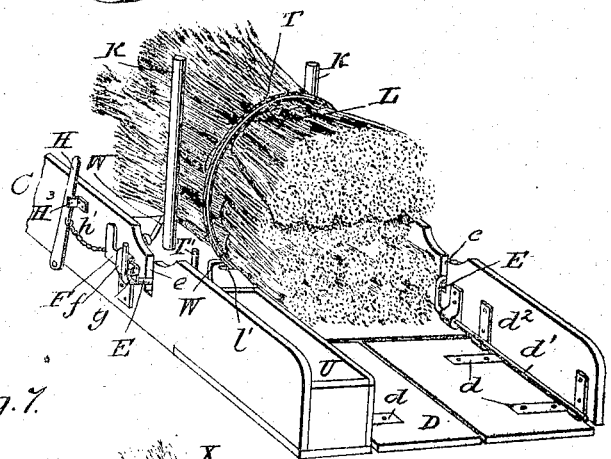
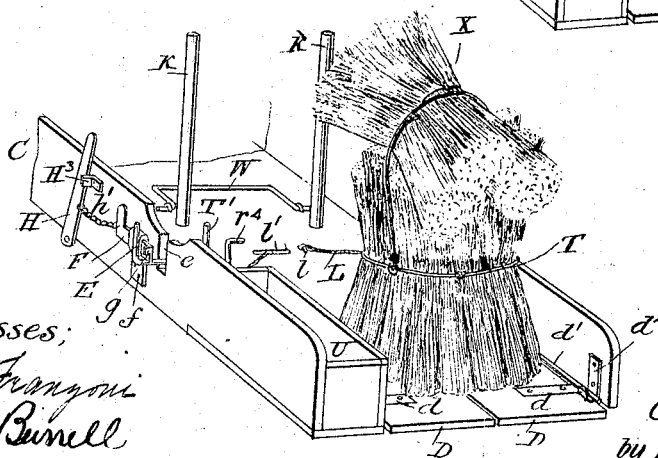

G. MARSHALL.
MACHINE FOR MAKING SHOCKS.
APPLICATION FILED MAY 3, 1909.
937,454.
Patented Oct. 19, 1909.
4 SHEETS—SHEET 3.
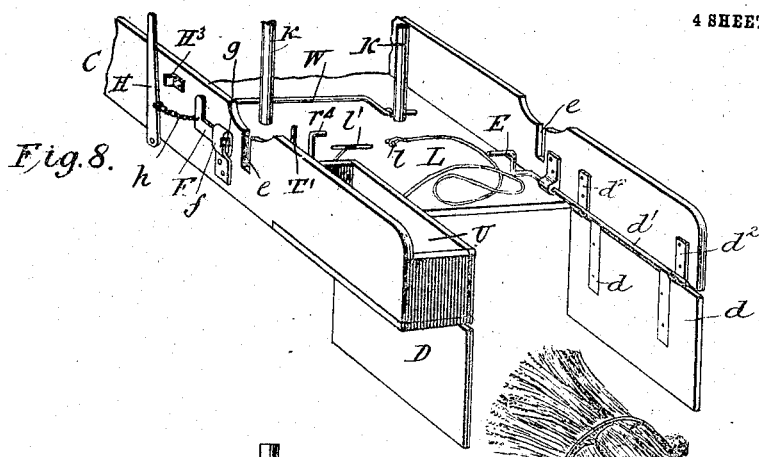
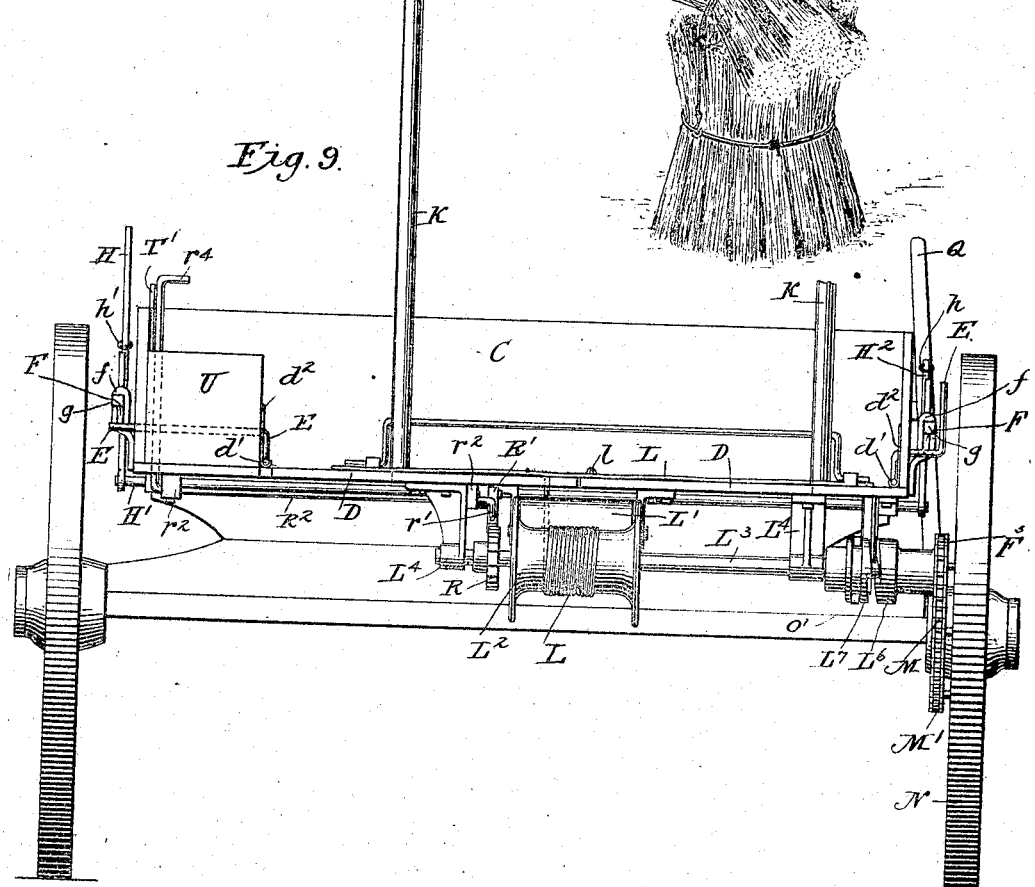
Witnesses:
Inventor
GEORGE MARSHALL
by his attorneys

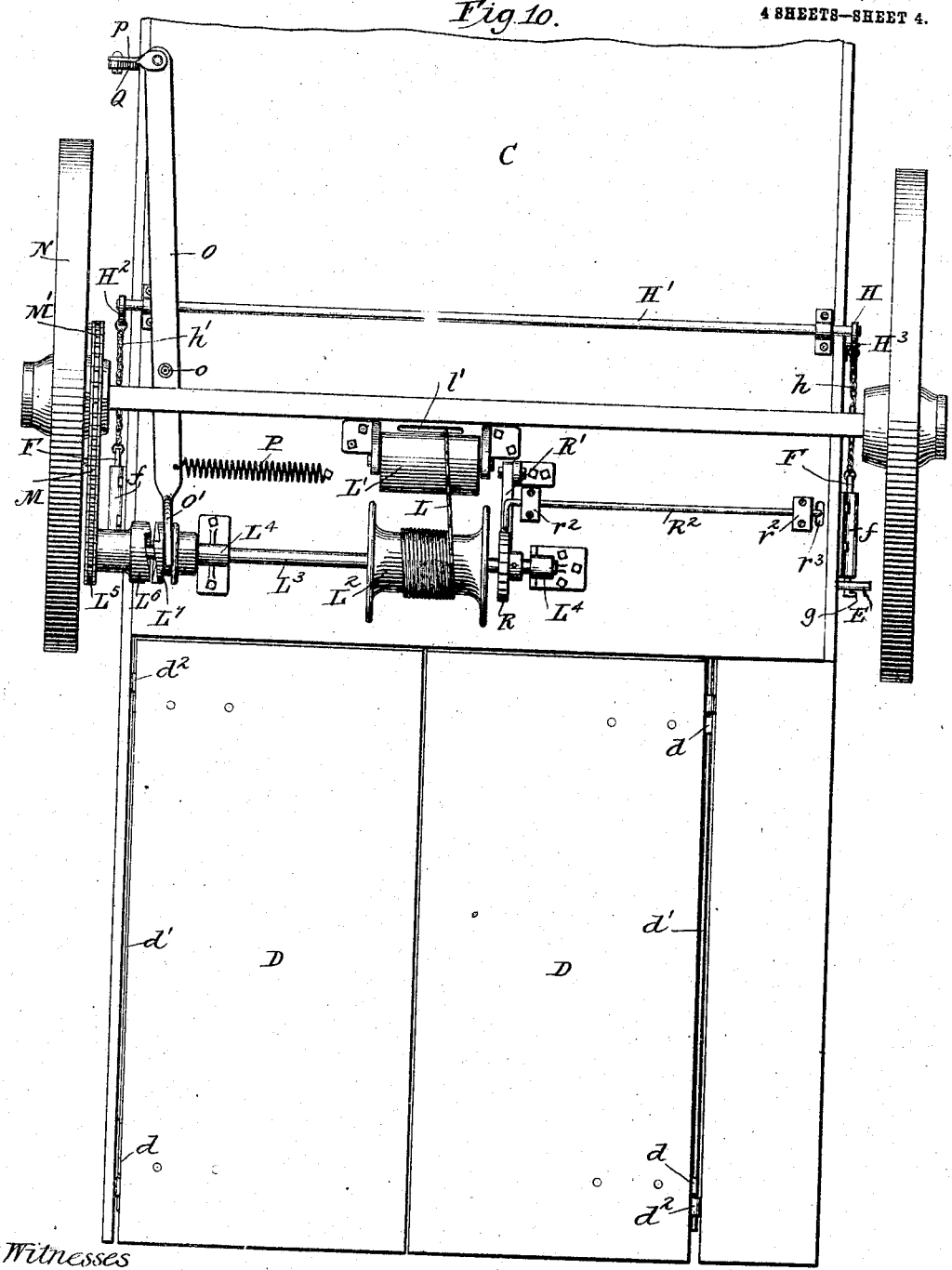

UNITED STATES PATENT OFFICE.

GEORGE MARSHALL, OF FREMONT, NEBRASKA.

MACHINE FOR MAKING SHOCKS.

937,454.     Specification of Letters Patent.     Patented Oct. 19, 1909.

Application filed May 3, 1909. Serial No. 493,706.

*To all whom it may concern:*

Be it known that I, GEORGE MARSHALL, a citizen of the United States of America, residing in Fremont, in the county of Dodge and State of Nebraska, have invented certain new and useful Improvements in Machines for Making Shocks, of which the following is a specification.

Usually the sheaves dropped by a binding machine are collected by hand and formed into shocks by setting them up endwise around each other and applying cap sheaves. This is a slow and laborious task. The shocks are not secure, being liable to fall to pieces in high winds. It has heretofore been proposed to form shocks by machinery, but so far as I am aware such machines have never gone into extensive use, owing probably to complications or imperfections in the mechanism or in the prohibitive cost of the machines.

According to my invention I have provided mechanism for forming shocks which is at once simple, durable and efficient, being adapted to expeditiously form shocks which are tight and strong, easily manipulated and not liable to fall to pieces in high winds or when being handled. I provide a wagon on which I place upright posts or standards so spaced as to receive a number of sheaves and hold them while being bound. The wagon which travels abreast of the binder, receives the sheaves as fast as formed on an elevator which extends from the place where the bundle carrier or the binder is usually attached to the side of the wagon and drops the sheaves therein. A rope attached to the bottom of the wagon extends through a hole in the wagon, around a pulley mounted on the underside of the wagon and then around a windlass or drum, mounted on a shaft which carries a sprocket wheel gearing with one of the hind wheels. The sprocket wheel is able to revolve independently of the shaft which carries the drum, but the drum is rigidly attached to the shaft and said shaft carries a clutch member which revolves at all times with the shaft and which is adapted to engage a clutch member rigidly connected with the sprocket wheel. Mechanism is provided for throwing the clutch members into and out of engagement with each other, the operation being such that when these members are engaged and the wagon is traveling the drum is revolved and the compressing rope connected therewith is wound on the drum. A locking pawl or detent is provided which holds the rope taut and by releasing this pawl the rope may be slackened. This compressing rope is adapted to extend around the sheaves or bundles and when drawn tight compresses the sheaves into a compact bundle. Another rope is provided on the floor of the wagon near the posts and when the sheaves are compressed by the compressing rope the binding rope is drawn tight and tied securely. When the bundle is thus formed I place cap sheaves on it and secure these sheaves in place by suitable devices such as rods, pins or ropes. The shock thus completed is turned into an upright position and moved on to trap doors in the bottom of the wagon at its rear end. These doors are normally held up by bolts, but when the bolts are released the trap doors drop and allow the shock to fall to the ground. I have also provided a device for holding up the front or headed ends of the sheaves as they are being placed between the posts or standards so that the completed bundle may be given a uniform shape on all sides.

In the accompanying drawings, Figure 1 is a perspective view of my improved shocking mechanism showing its relative position to a grain binder while in operation. Fig. 2 is a view of the binding rope for binding the sheaves together after they have been formed into a bundle. Fig. 3 shows a rope which may be employed for attaching the cap sheaves to the bundle. Fig. 4 shows a rod which may also be employed for attaching the cap sheaves to the bundle. Fig. 5 is a perspective view, showing how a number of bundles or sheaves are placed in position to be compressed and bound. Fig. 6 shows the next step where the sheaves are compressed and bound tightly by the binding rope. Fig. 7 is a perspective view, showing how the shock is turned up on its end over the trap doors and the cap sheaves are applied. Fig. 8 shows how the trap doors are opened and the shock dropped on to the ground. Fig. 9 is a rear elevation on an enlarged scale of the mechanism, showing particularly the means for winding the compressing rope. Fig. 10 is a bottom plan view on an enlarged scale showing the mechanism just referred to.

My improved shocking mechanism is intended to be used especially in connection with grain binders. The binding machine A needs no material modification but instead of delivering the bundles to the ground it delivers to an endless elevator or carrier B which may be of any suitable construction. As shown, it is an endless elevator or carrier operated by gearing from the harvesting machine, hinged to brackets $b$ projecting from the frame of the binder and provided at its upper end with a bale $b^1$ to which is attached a rope $b^2$ by means of which the carrier may be elevated and depressed at will.

The wagon C may be of any suitable kind. It may sometimes be used for other purposes on a farm but it is adapted especially for use in forming shocks of grain. At the rear it is provided with trap doors D, each of which is provided with strap hinges $d$ secured to a rod $d^1$ mounted to turn in brackets $d^2$ secured to the inner face of the side of the wagon. Each rod is formed with a bent arm E, which projects outwardly through a slot or opening $e$ and is adapted to be engaged by a bolt for locking the door in its upright position.

F indicates a sliding bolt, one on each side of the wagon. The forward movement of each bolt is limited by a stop or flange $g$ formed on its rear end. Each bolt is mounted to slide in a guide $f$. When the doors are elevated the arms E engage the bolts F in the manner indicated in Fig. 5, and at this time the trap doors are held in a horizontal or level position. In order to permit the trap doors to drop I provide a lever H which is attached to a rock shaft $H^1$ (shown by dotted lines in Fig. 1), mounted to turn in bearing brackets attached to the underside of the wagon body and carrying on one end an arm $H^2$ which is connected by a chain $h$ with the adjacent bolt F, the bolt on the opposite side of the wagon being attached by a chain $h^1$ to the lever H. By pulling the lever H forward the bolts F are withdrawn from engagement with the arms E and the trap doors will fall, in the manner indicated in Fig. 8. The doors may be elevated by swinging the arms E upwardly and pushing the bolts F rearward. The rearward movement of the lever H may be limited by a stop $H^3$. The forward movement of the lever is limited by means of the chain connection with the bolt F, the forward movement of which is limited by the stop flange $g$.

In the rear part of the wagon body in front of the trap doors are arranged vertical posts or standards K which enter and closely fit in sockets in the bottom of the wagon. These posts are of sufficient length and are spaced suitably to accommodate a number of sheaves or bundles of grain. The posts are secured in their sockets but may be removed when desired. As shown, the posts are spaced to accommodate twenty-five sheaves though of course a different number may be taken to form a shock.

A bent rod W is hinged to the bottom of the wagon in front of the posts K. When the sheaves are being laid within the posts their front or headed ends are made to rest on the bent rod W, in the manner indicated in Fig. 6 so that the front ends of the lower layer of sheaves will be so elevated that the completed bundle or shock will have the same shape on all sides.

A compressing rope L is attached at $l$ to the bottom of the wagon near the posts K and extends through a slot or hole $l^1$ and then around a pulley $L^1$ mounted in brackets on the bottom of the wagon, and thence to a drum or windlass $L^2$ to which one end of the rope is attached. The drum or windlass $L^2$ is secured to a shaft $L^3$ arranged crosswise of the wagon and mounted in brackets $L^4$. At its outer end the shaft carries a sprocket wheel $L^5$ which is mounted loosely on the shaft but is connected by chain gearing M with a sprocket wheel $M^1$, connected with one of the driving wheel N or with the axle on which said wheel is mounted. To the sprocket wheel $L^5$ is secured a clutch member $L^6$ which is loose on the shaft $L^3$ and this is adapted to engage a clutch member $L^7$, which, while free to slide on the shaft $L^3$, is mounted to always revolve therewith. It is obvious that if the clutch members are in engagement with each other and the wheel N is turned the drum $L^2$ will be correspondingly turned. But when the clutch members are disengaged the wheel N may revolve without revolving the drum $L^2$. In order to operate the clutch I provide a lever O fulcrumed at $o$ to the bottom of the wagon and provided with a forked end $o^1$ which engages the clutch member $L^7$, in the manner clearly shown. A spring P attached at one end to the bottom of the wagon and at its opposite end to the lever O between its pivot and its forked end tends to disengage the clutch members. The forward end of the lever O is connected by a link $p$ with a lever Q hinged to the side of the wagon. By operating this lever the clutch members may be thrown into and out of engagement with each other.

On the shaft $L^3$ is a ratchet wheel R engaged by a pawl $R^1$. This pawl is normally held by gravity in engagement with the ratchet wheel but may be thrown out of engagement therewith by means of a rod $R^2$, the bent end of which $r^1$ is adapted to bear against the pawl and raise it. The rod $R^2$ is mounted to turn in bearings $r^2$ and its outer end is bent upwardly and extends through a slot $r^3$ in the bottom of the wagon. The upper end $r^4$ of the rod is within convenient reach of the workman who can, by operating the rod, throw the detent pawl out of engagement with the ratchet wheel. T (Fig. 2) indicates a binding rope which, before any sheaves are placed between the posts K, is laid across the wagon in the manner indicated in Fig. 1. One end of this rope is looped at $t$ and is held by a post or standard $T^1$. The rope is also provided with a loop $t^1$ to facilitate in tying it. Before sheaves are placed between the posts the compressing rope is arranged in the manner indicated in Fig. 1.

An attendant receives the bundles or sheaves as they are delivered to the elevator and places them between the posts K until a suitable number have been deposited therein, as indicated in Fig. 5, the rope T being so placed that as the sheaves are deposited between the posts they will lie on top of the rope, the rope L being looped in the manner indicated in Fig. 1. When a suitable number of bundles have been placed between the posts the compressing rope is made to surround the bundles in the manner indicated in Fig. 6 and then the lever Q is operated to throw the clutch members into engagement with each other so that as the wagon moves on the rope is wound up on the drum $L^2$ and the rope is drawn taut around the sheaves which are thus compressed into a compact bundle. Then the binding rope T is drawn around the bundle and tied in the manner indicated in Fig. 6. As soon as this is done the rod $R^2$ may be operated to raise the pawl $R^1$ and thus slacken the tension on the rope L which may now be removed from the bundle and thrown to one side. After the binding rope has been tied the shock may be turned to an upright position as indicated in Fig. 7, and cap sheaves S may be applied and secured to the bundle by means if metallic rods or pins V, such as shown in Fig. 4, or by means of cords X, such as shown in Fig. 3. As indicated the cord X is provided with a hook $x$ which may be made to engage the binding rope T, in the manner indicated in Fig. 7, and then the cord may be drawn over the top of the shock and over the cap sheaves and its end tied to the rope T on the opposite side of the shock. Preferably the cap sheaves are arranged in the manner indicated in order to best shed water. In placing the sheaves between the posts K the middle row is made to project slightly at the front as indicated in Fig. 5. In this way the cap sheaves are better held and air spaces are provided both at the top and at the bottom of the shock. A suitable number of lengths of binding ropes T and shock-securing cords X or pins V may be carried in a box U preferably located at the back of the wagon.

There will be no difficulty in keeping the wagon abreast of the binder as the elevator has considerable range of movement independently of the wagon and the wagon may be made quite long. The attendant of the wagon may very quickly place the sheaves between the posts and as quickly cause the compressing rope to be drawn taut and secure the binding rope. In like manner the trap doors may be quickly operated either to open or to close them.

I claim as my invention:

1. The combination with a binding machine of means for forming shocks, comprising a wagon adapted to travel abreast of the binding machine, elevating mechanism on the binding machine for delivering sheaves to the wagon, upright posts detachably connected to the wagon and adapted to receive between them a number of sheaves, a compressing rope attached to the rear portion of the wagon body, and a drum or windlass to which the rope is connected and which is operatively connected with one of the carrying wheels of the wagon.

2. The combination of a wagon having trap doors in the rear part of its body portion, upright posts attached to the wagon body in front of the doors, a compressing rope attached at one end to the wagon body in front of the doors and extending through the body in front of the doors on the under side of the wagon, a drum to which the compressing rope is attached, and mechanism operated by the wagon wheels for actuating the drum.

3. The combination of a wagon having trap doors in the rear part of its body portion, a compressing rope attached at one end to the wagon body and extending through the wagon body in front of the doors, a drum on the under side of the wagon to which the compressing rope is attached, and means for connecting the drum with one of the wagon wheels and for disconnecting it therefrom.

4. The combination of a wagon, a compressing rope attached at one end to the wagon body at a point considerably in advance of its rear end and which extends through the wagon body, a drum on the under side of the wagon to which the compressing rope is attached, a shaft to which the drum is secured, a clutch member attached to the shaft, another clutch member geared with one of the wagon wheels, means for shifting the clutch, detent mechanism for holding the drum against rotation after the compressing rope has been drawn taut and after the clutch members have been separated, and devices for controlling the detent mechanism.

5. The combination of the wagon body, a compressing rope, means for operating the rope, posts or standards attached to the wagon body between which the sheaves are piled, and means in the wagon body for holding up above the level of the wagon one end of the sheaves as they are placed between the posts.

In testimony whereof, I have hereunto subscribed my name.

GEORGE MARSHALL.

Witnesses:
S. S. SIDNER,
JESSIE MILLER.